(12) United States Patent
Kawakita et al.

(10) Patent No.: US 11,276,856 B2
(45) Date of Patent: Mar. 15, 2022

(54) POSITIVE ELECTRODE ACTIVE MATERIAL FOR NONAQUEOUS ELECTROLYTE SECONDARY BATTERIES AND NONAQUEOUS ELECTROLYTE SECONDARY BATTERY

(71) Applicant: Panasonic Intellectual Property Management Co., Ltd., Osaka (JP)

(72) Inventors: Akihiro Kawakita, Hyogo (JP); Takeshi Ogasawara, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 250 days.

(21) Appl. No.: 16/472,529

(22) PCT Filed: Jan. 17, 2018

(86) PCT No.: PCT/JP2018/001111
§ 371 (c)(1),
(2) Date: Jun. 21, 2019

(87) PCT Pub. No.: WO2018/142929
PCT Pub. Date: Aug. 9, 2018

(65) Prior Publication Data
US 2021/0135210 A1    May 6, 2021

(30) Foreign Application Priority Data

Jan. 31, 2017 (JP) .............................. JP2017-016035

(51) Int. Cl.
*H01M 4/525* (2010.01)
*H01M 4/131* (2010.01)
*H01M 4/02* (2006.01)

(52) U.S. Cl.
CPC ........... *H01M 4/525* (2013.01); *H01M 4/131* (2013.01); *H01M 2004/021* (2013.01); *H01M 2004/028* (2013.01)

(58) Field of Classification Search
CPC ................. H01M 4/525; H01M 4/131; H01M 2004/021; H01M 2004/028
See application file for complete search history.

(56) References Cited

U.S. PATENT DOCUMENTS

2005/0227147 A1* 10/2005 Kogetsu ............ H01M 10/0525
429/231.95
2006/0177739 A1    8/2006 Endo et al.
(Continued)

FOREIGN PATENT DOCUMENTS

JP        H07245105        *    9/1995
JP        2014-146473 A         8/2014
(Continued)

*Primary Examiner* — Jayne L Mershon
(74) *Attorney, Agent, or Firm* — Westerman, Hattori, Daniels & Adrian, LLP

(57) ABSTRACT

A positive electrode active material for nonaqueous electrolyte secondary batteries includes: secondary particles composed of aggregated primary particles of a lithium composite oxide containing Ni: a rare earth compound attached to the surfaces of the secondary particles; a tungsten compound attached to the surfaces of the secondary particles: and lithium carbonate attached to the surfaces of the primary particles inside the secondary particles. The rate of Ni in the lithium composite oxide containing Ni with respect to the total number of moles of metal elements other than lithium in the lithium composite oxide containing Ni is 80 percent by mole or more, and the content of the lithium carbonate with respect to the total mass of the lithium composite oxide containing Ni is 0.3 percent by mass or more.

7 Claims, 1 Drawing Sheet

(56) References Cited

U.S. PATENT DOCUMENTS

| | | | | |
|---|---|---|---|---|
| 2013/0232772 A1* | 9/2013 | Tikhonov | H01M 4/139 | |
| | | | 29/623.5 | |
| 2015/0056512 A1* | 2/2015 | Takeuchi | H01M 4/366 | |
| | | | 429/223 | |
| 2015/0147655 A1* | 5/2015 | Park | H01M 4/582 | |
| | | | 429/231.1 | |
| 2015/0221943 A1 | 8/2015 | Nishioka et al. | | |
| 2015/0228974 A1 | 8/2015 | Kokado et al. | | |
| 2016/0013478 A1* | 1/2016 | Satow | H01M 4/364 | |
| | | | 429/223 | |
| 2016/0111712 A1* | 4/2016 | Oyama | H01M 4/136 | |
| | | | 429/221 | |
| 2016/0118648 A1 | 4/2016 | Gunji et al. | | |
| 2016/0181611 A1* | 6/2016 | Cho | H01M 4/525 | |
| | | | 429/221 | |
| 2017/0141391 A1* | 5/2017 | Jito | H01M 4/621 | |
| 2017/0222221 A1* | 8/2017 | Park | C01G 53/42 | |
| 2017/0288215 A1 | 10/2017 | Mitsumoto et al. | | |

FOREIGN PATENT DOCUMENTS

| | | |
|---|---|---|
| JP | 2015-144108 A | 8/2015 |
| JP | 2016-081903 A | 5/2016 |
| WO | 2005/008812 A1 | 1/2005 |
| WO | 2012/043783 A1 | 4/2012 |
| WO | 2013/145846 A1 | 10/2013 |
| WO | 2014/155990 A1 | 10/2014 |
| WO | 2016/017093 A1 | 2/2016 |
| WO | 2016/035852 A1 | 3/2016 |

\* cited by examiner

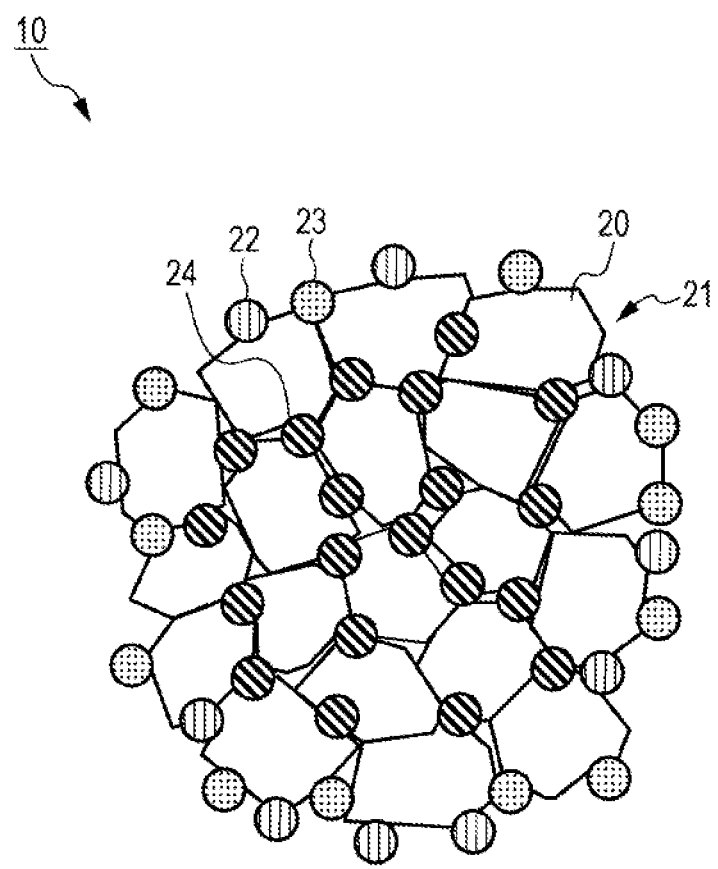

POSITIVE ELECTRODE ACTIVE MATERIAL FOR NONAQUEOUS ELECTROLYTE SECONDARY BATTERIES AND NONAQUEOUS ELECTROLYTE SECONDARY BATTERY

TECHNICAL FIELD

The present invention relates to techniques of a positive electrode active material for nonaqueous electrolyte secondary batteries and a nonaqueous electrolyte secondary battery.

BACKGROUND ART

In recent years, as a secondary battery having a high output and a high energy density, a nonaqueous electrolyte secondary battery which includes a positive electrode, a negative electrode, and a nonaqueous electrolyte and which performs charge/discharge by moving lithium ions between the positive electrode and the negative electrode has been widely used.

As a positive electrode active material used for the positive electrode of the nonaqueous electrolyte secondary battery, for example, the following has been known.

For example, PTL 1 has disclosed a positive electrode active material for nonaqueous electrolyte secondary batteries, the active material including lithium composite oxide particles containing Ni and a rare earth compound attached to the surfaces of the above particles.

In addition, for example, PTL 2 has disclosed a positive electrode active material for nonaqueous electrolyte secondary batteries, the active material including lithium composite oxide particles containing Ni and lithium carbonate attached to the surfaces of the above particles.

In addition, for example, PTL 3 has disclosed a positive electrode active material for nonaqueous electrolyte secondary batteries, the active material including lithium composite oxide particles containing Ni and particles which contain W and Li and which are attached to the surfaces of the above particles.

CITATION LIST

Patent Literature

PTL 1: International Publication No. 2005/008812
PTL 2: International Publication No. 2016/035852
PTL 3: International Publication No. 2012/043783

SUMMARY OF INVENTION

Incidentally, in a nonaqueous electrolyte secondary battery using a lithium composite oxide containing Ni, when the content of Ni in the lithium composite oxide is increased, a direct current resistance at initial charge/discharge of the nonaqueous electrolyte secondary battery is increased, and for example, output characteristics of the nonaqueous electrolyte secondary battery may be degraded in some cases. In particular, when a lithium composite oxide is used in which the rate of Ni in the lithium composite oxide containing Ni is 80 percent by mole or more with respect to the total number of moles of metal elements other than lithium, the increase in direct current resistance at the initial charge/discharge of the nonaqueous electrolyte secondary battery becomes remarkable.

Accordingly, an object of the present disclosure is to provide a positive electrode active material for nonaqueous electrolyte secondary batteries, the positive electrode active material being capable of suppressing the increase in direct current resistance at initial charge/discharge of a nonaqueous electrolyte secondary battery even in the case in which a lithium composite oxide containing Ni in an amount of 80 percent by mole or more with respect to the total number of moles of metal elements other than lithium is used.

A positive electrode active material for nonaqueous electrolyte secondary batteries according to one aspect of the present disclosure comprises: secondary particles composed of aggregated primary particles of a lithium composite oxide containing Ni; a rare earth compound attached to the surfaces of the secondary particles; a tungsten compound attached to the surfaces of the secondary particles; and a lithium carbonate attached to the surfaces of the primary particles inside the secondary particles. The rate of Ni in the lithium composite oxide containing Ni is 80 percent by mole or more with respect to the total number of moles of metal elements other than lithium in the lithium composite oxide containing Ni, and the content of the lithium carbonate is 0.3 percent by mass or more with respect to the total mass of the lithium composite oxide containing Ni.

According to the aspect of the present disclosure, even in the case in which a lithium composite oxide containing Ni in an amount of 80 percent by mole or more with respect to the total number of moles of metal elements other than lithium is used, a positive electrode active material for nonaqueous electrolyte secondary batteries can be provided which is capable of suppressing the increase in direct current resistance at initial charge/discharge of a nonaqueous electrolyte secondary battery.

BRIEF DESCRIPTION OF DRAWINGS

FIG. 1 is a schematic cross-sectional view of a positive electrode active material according to this embodiment.

DESCRIPTION OF EMBODIMENTS (Underlying Knowledge Forming Basis of the Present Disclosure)

Heretofore, in a nonaqueous electrolyte secondary battery which uses a positive electrode active material, the positive electrode active material including secondary particles composed of aggregated primary particles of a lithium composite oxide containing Ni, and the rate of Ni in the lithium composite oxide containing Ni being 80 percent by mole or more with respect to the total number of moles of metal elements other than lithium in the lithium composite oxide containing Ni, for example, at initial charge/discharge, since the secondary particles of the lithium composite oxide containing Ni may be broken, and/or a coating film having a low lithium ion permeability may be formed on each secondary particle surface by decomposition of a nonaqueous electrolyte, the lithium ion conductivity on the surfaces of the secondary particles and between the primary particles is degraded, so that a direct current resistance at the initial charge/discharge may be increased in some cases. Accordingly, through intensive research, the present inventors found that as a material which can suppress the decrease in lithium ion conductivity on the surfaces of the secondary particles and/or between the primary particles and which can also suppress the increase in direct current resistance at the initial charge/discharge of the nonaqueous electrolyte secondary battery, a rare earth compound, a tungsten compound, and lithium carbonate are effective, and as a result, a positive electrode active material for nonaqueous electrolyte secondary batteries according to the following aspect was finally conceived.

A positive electrode active material for nonaqueous electrolyte secondary batteries according to one aspect of the present disclosure includes: secondary particles composed of aggregated primary particles of a lithium composite oxide containing Ni; a rare earth compound attached to the surfaces of the secondary particles; a tungsten compound attached to the surfaces of the secondary particles; and a lithium carbonate attached to the surfaces of the primary particles inside the secondary particles, the rate of Ni in the lithium composite oxide containing Ni is 80 percent by mole or more with respect to the total number of moles of metal elements other than lithium in the lithium composite oxide containing Ni, and the content of the lithium carbonate is 0.3 percent by mass or more with respect to the total mass of the lithium composite oxide containing Ni. In addition, according to the positive electrode active material for nonaqueous electrolyte secondary batteries, which is one aspect of the present disclosure, the increase in direct current resistance at the initial charge/discharge of the nonaqueous electrolyte secondary battery can be suppressed.

Although this mechanism has not been clearly understood, the following may be assumed. In addition, hereinafter, the lithium composite oxide containing Ni, the rate of Ni of which is 80 percent by mole or more with respect to the total number of moles of metal elements other than lithium, is called a high Ni-containing lithium composite oxide.

Since the lithium carbonate in a predetermined amount is present on the surfaces of the primary particles inside the secondary particles of the high Ni-containing lithium composite oxide, the binding force between the primary particles is increased, and the secondary particles are suppressed from being broken in a charge/discharge process and the like; hence, it is believed that the lithium ion conductivity and the electron conductivity between the primary particles are suppressed from being decreased. In addition, since the tungsten compound is present on the surfaces of the secondary particles of the high Ni-containing lithium composite oxide, it is believed that lithium ions are likely to move between the nonaqueous electrolyte and the secondary particles. Furthermore, since the tungsten compound and the rare earth compound coexist on the surfaces of the secondary particles, and the lithium carbonate are present in the vicinities of those substances, it is believed that the lithium ion conductivity of a coating film formed on each of the surfaces of the secondary particles by decomposition of the nonaqueous electrolyte is improved.

That is, according to the positive electrode active material for nonaqueous electrolyte secondary batteries, which is one aspect of the present disclosure, by the rare earth compound and the tungsten compound, each of which is attached to the surfaces of the secondary particles of the high Ni-containing lithium composite oxide, and a predetermined amount of the lithium carbonate attached to the surfaces of the primary particles inside the secondary particles, since the lithium ion conductivity on the surfaces of the secondary particles and between the primary particles is suppressed from being decreased, it is believed that the increase in direct current resistance at the initial charge/discharge of the nonaqueous electrolyte secondary battery can be suppressed.

Hereinafter, an example of a nonaqueous electrolyte secondary battery using the positive electrode active material for nonaqueous electrolyte secondary batteries, which is one aspect of the present disclosure, will be described. The FIGURE to be used for illustrating the following embodiment is schematically drawn, and the dimensional ratio and the like of a constituent element drawn in the FIGURE may be different from that of an actual element in some cases.

The nonaqueous electrolyte secondary battery, which is one example of the embodiment, includes a positive electrode, a negative electrode, and a nonaqueous electrolyte. It is preferable to provide a separator between the positive electrode and the negative electrode. In particular, the nonaqueous electrolyte secondary battery has the structure in which a winding type electrode body formed by winding the positive electrode and the negative electrode with the separator interposed therebetween and the nonaqueous electrolyte are received in an exterior package. The electrode body is not limited to the winding type electrode body, and other electrode bodies, such as a laminate type electrode body in which at least one positive electrode and at least one negative electrode are laminated to each other with at least one separator interposed therebetween, may also be used. In addition, the type of nonaqueous electrolyte secondary battery is not particularly limited, and for example, there may be mentioned a cylindrical type, a square type, a coin type, a button type, or a laminate type.

Hereinafter, the positive electrode, the negative electrode, the nonaqueous electrolyte, and the separator used for the nonaqueous electrolyte secondary battery, which is one example of the embodiment, will be described in detail.

<Positive Electrode>

The positive electrode is formed, for example, of a positive electrode collector, such as metal foil, and a positive electrode active material layer formed on the positive electrode collector. For the positive electrode collector, for example, metal foil, such as aluminum, stable in a positive electrode potential range or a film on which the metal mentioned above is arranged as a surface layer may be used. The positive electrode active material layer contains, for example, a positive electrode active material, a binding material, an electrically conductive material, and the like.

The positive electrode may be obtained, for example, in such a way that a positive electrode mixture slurry containing the positive electrode active material, the binding material, the electrically conductive material, and the like is applied to the positive electrode collector and then dried to form the positive electrode active material layer on the positive electrode collector, and this positive electrode active material layer is then rolled.

FIG. 1 is a schematic cross-sectional view of a positive electrode active material according to this embodiment. As shown in FIG. 1, a positive electrode active material 10 includes secondary particles 21 of a lithium composite oxide containing Ni which are formed by aggregation of primary particles 20 of the lithium composite oxide containing Ni; a rare earth compound 22 attached to the surfaces of the secondary particles 21; a tungsten compound 23 attached to the surfaces of the secondary particles 21; and a lithium carbonate 24 attached to the surfaces of the primary particles 20 inside the secondary particles 21. The "attached to the surfaces of the secondary particles 21" indicates the same as "attached to the surfaces of the primary particles 20 at the surfaces of the secondary particles 21".

The lithium composite oxide containing Ni is not particularly limited as long as the rate of Ni is 80 percent by mole or more with respect to the total number of moles of metal elements other than lithium. Hereinafter, this lithium composite oxide is called a high Ni-containing lithium composite oxide. For example, since the charge/discharge capacity of the nonaqueous electrolyte secondary battery can be further improved, the high Ni-containing lithium composite oxide is preferably a lithium composite oxide, the rate of Ni of which is 80 percent by mole or more with respect to the total number of moles of metal elements other than lithium, and the rate of Co of which is 15 percent by mole or less. In addition, by the use of the lithium composite oxide as described above, although the direct current resistance at the initial charge/discharge of the nonaqueous electrolyte secondary battery tends to be increased, as described above, by the presence of the rare earth compound, the tungsten compound, and the lithium carbonate, the increase in direct current resistance at the initial charge/discharge can be suppressed.

The high Ni-containing lithium composite oxide is represented, for example, by the following general formula.

$$Li_xNi_yCo_\alpha M_\beta O_{2-\gamma} \tag{1}$$

In the formula, x, y, α, β, and γ respectively satisfy $0.95<x<1.2$, $0.80 \leq y \leq 1$, $0 \leq \alpha \leq 0.15$, $0 \leq \beta \leq 0.1$, $y+\alpha+\beta=1$, and $0 \leq \gamma < 0.05$. In addition, in the formula, M is not particularly limited as long as being at least one element other than Li, Ni, and Co, and for example, at least one element selected from Mn, Fe, Al, Mg, Ti, Cr, Cu, Ze, Sn, Zr, Nb, Mo, Ta, W, Na, K, Ba, Sr, Bi, Be, and B may be mentioned.

The average particle diameter of the primary particles of the high Ni-containing lithium composite oxide is preferably 100 nm to 5 μm and more preferably 300 nm to 2 μm. When the average particle diameter of the primary particles is less than 100 nm, the number of interfaces of the primary particles including the inside of the secondary particles are excessively increased, and for example, by the expansion and contraction of the primary particles by charge/discharge cycles, the primary particles are liable to be broken in some cases. On the other hand, when the average particle diameter of the primary particles is more than 5 μm, the number of the interfaces of the primary particles including the inside of the secondary particles is excessively decreased, and in particular, the output of the nonaqueous electrolyte secondary battery may be decreased in some cases. The average particle diameter of the secondary particles of the high Ni-containing lithium composite oxide is preferably 2 μm to 40 μm and more preferably 4 μm to 20 μm. When the average particle diameter of the secondary particles is less than 2 μm, the packing density is decreased, and the charge/discharge capacity of the nonaqueous electrolyte secondary battery may be decreased in some cases. On the other hand, when the average particle diameter of the secondary particles is more than 40 μm, the output of the nonaqueous electrolyte secondary battery may be decreased in some cases.

The average particle diameter of the primary particles and the average particle diameter of the secondary particles can be obtained, for example, in such a way that an image analysis is performed by observation using a scanning electron microscope to measure the particle diameters. In particular, the maximum lengths of the respective primary particles or secondary particles are measured using 100 particles, and a volume average particle diameter obtained by calculating the volume of each sphere having the length described above as the diameter is used.

Although the rare earth compound may be attached only to the surfaces of the secondary particles of the high Ni-containing lithium composite oxide, the rare earth compound may be attached not only to the surfaces of the secondary particles but also to the surfaces of the primary particles inside the secondary particles. The particle mode of the rare earth compound may be either the primary particles or the secondary particles.

As the rare earth compound, for example, at least one compound selected from a hydroxide, an oxyhydroxide, an oxide, a carbonate compound, a phosphate compound, and a fluorine compound, each of which contains a rare earth, is preferable. As a rare earth element forming the rare earth compound, at least one selected from scandium, yttrium, lanthanum, cerium, praseodymium, neodymium, samarium, europium, gadolinium, terbium, dysprosium, holmium, erbium, thulium, ytterbium, and lutetium may be mentioned. Among those elements, since the direct current resistance at the initial charge/discharge of the nonaqueous electrolyte secondary battery can be further suppressed, at least one selected from neodymium, samarium, and erbium is particularly preferable.

The content of the rare earth compound with respect to the total mass of the metal elements other than lithium in the high Ni-containing lithium composite oxide is, for example, preferably 0.02 to 0.5 percent by mass and more preferably 0.03 to 0.3 percent by mass on a rare earth element basis. When the content of the rare earth compound with respect to the total mass of the metal elements other than lithium in the high Ni-containing lithium composite oxide is less than 0.02 percent by mass or more than 0.5 percent by mass on a rare earth element basis, compared to the case in which the above range is satisfied, the direct current resistance at the initial charge/discharge of the nonaqueous electrolyte secondary battery may be increased in some cases.

Although the tungsten compound may be attached only to the surfaces of the secondary particles of the high Ni-containing lithium composite oxide, the tungsten compound may be attached not only to the surfaces of the secondary particles but also to the surfaces of the primary particles inside the secondary particles. The tungsten compound is preferably at least one compound selected, for example, from tungsten oxides, such as $WO_2$, $WO_3$, and $W_2O_5$, and salts thereof, such as lithium tungstate. Among those compounds mentioned above, since the direct current resistance at the initial charge/discharge of the nonaqueous electrolyte secondary battery is further suppressed, lithium tungstate is preferable.

The content of the tungsten compound with respect to the total mass of the metal elements other than lithium in the high Ni-containing lithium composite oxide is, for example, preferably 0.1 to 5.0 percent by mass and more preferably 0.3 to 3.0 percent by mass on a tungsten element basis. When the content of the tungsten compound with respect to the total mass of the metal elements other than lithium in the high Ni-containing lithium composite oxide is less than 0.1 percent by mass or more than 5.0 percent by mass, compared to the case in which the above range is satisfied, the direct current resistance at the initial charge/discharge of the nonaqueous electrolyte secondary battery may be increased in some cases.

The lithium carbonate may be attached at least to the surfaces of the primary particles inside the secondary particles of the high Ni-containing lithium composite oxide. That is, the lithium carbonate may be attached not only to the surfaces of the primary particles inside the secondary particles of the high Ni-containing lithium composite oxide but also to the surfaces of the secondary particles. As the lithium carbonate, for example, there may be mentioned $Li_2CO_3$ or $LiHCO_3$.

Since the direct current resistance at the initial charge/discharge of the nonaqueous electrolyte secondary battery is suppressed, although the content of the lithium carbonate attached to the surfaces of the primary particles inside the secondary particles of the high Ni-containing lithium composite oxide may be 0.3 percent by mass or more with respect to the total mass of the high Ni-containing lithium composite oxide, the content described above is preferably 0.35 to 2.0 percent by mass and more preferably 0.4 to 1.5 percent by mass.

The contents of the rare earth compound, the tungsten compound, and the lithium carbonate can be measured, for example, by the following methods. After the positive electrode active material particles for nonaqueous electrolyte secondary batteries according to this embodiment are dissolved by a hydrochloric acid or a hydrofluoric acid, a solution thus obtained is measured by an inductively-coupled plasma ionization (ICP) emission spectrometry, so that the content of each material can be obtained. The content of the lithium carbonate can be measured by a titration method (warder method). Hereinafter, the titration method (warder method) will be described.

<Titration Method (Warder Method)>

After the positive electrode active material particles for nonaqueous electrolyte secondary batteries according to this embodiment are added to purified water and were then stirred to prepare a suspension liquid in which the active material particles are dispersed in the purified water, this suspension liquid is filtrated, so that a filtrate containing an alkali eluted from the active material is obtained. Next, while the pH is measured, a hydrochloric acid is added little by little to the filtrate described above, and the attached amount of the lithium carbonate is calculated using the following formula (1) from the amount of a hydrochloric acid consumed until a first inflection point (at a pH of about 8) and the amount thereof consumed until a second inflection point (at a pH of about 4) of the pH curve.

$$\text{Amount of lithium carbonate (wt \%)} = (y(\text{ml}) - x(\text{ml})) \times a(\text{mol/L}) \times f \times (1/1000) \times 73.89 \text{ (g/mol)}/b(\text{g}) \times 100 \quad (1)$$

a (mol/L): concentration of hydrochloric acid used for titration b (g): amount of sample x (mL): amount of hydrochloric acid consumed until first inflection point (at a pH of about 8)

y (mL): amount of hydrochloric acid consumed until second inflection point (at a pH of about 4)

f: factor of hydrochloric acid used for titration

F.W. of lithium carbonate: 73.89 (g/mol)

In addition, the attachment of the rare earth compound and the tungsten compound to the surfaces of the secondary particles of the high Ni-containing lithium composite oxide can be confirmed, for example, by observation of the surfaces of the secondary particles using a scanning electron microscope (SEM) and an energy dispersion X-ray spectroscopy (EDS).

The BET specific surface area of the positive electrode active material for nonaqueous electrolyte secondary batteries according to this embodiment is, for example, preferably 0.05 to 0.8 m$^2$/g and more preferably 0.1 to 0.6 m$^2$/g. When the BET specific surface area is less than 0.05 m$^2$/g, compared to the case in which the above range is satisfied, for example, since the gaps between the primary particles of the high Ni-containing lithium composite oxide are small, and the permeability of the nonaqueous electrolyte is decreased, the input/output characteristics of the nonaqueous electrolyte secondary battery may be degraded in some cases. In addition, when the BET specific surface area is more than 0.8 m$^2$/g, compared to the case in which the above range is satisfied, for example, the binding property between the primary particles of the high Ni-containing lithium composite oxide is decreased, and hence, the durability may be degraded in some cases. The BET specific surface area of a lithium-containing transition metal oxide can be measured by a known BET type powder specific surface area measurement device. In addition, although depending on the particle diameter of a high Ni-containing lithium composite oxide to be used and the like, the BET specific surface area of the positive electrode active material for nonaqueous electrolyte secondary batteries is mainly influenced by the amount of the lithium carbonate on the surfaces of the primary particles inside the secondary particles of the high Ni-containing lithium composite oxide. Hence, by the adjustment of the content of the lithium carbonate, the BET specific surface area of the positive electrode active material for nonaqueous electrolyte secondary batteries can be adjusted.

The compression strength of the positive electrode active material for nonaqueous electrolyte secondary batteries according to this embodiment is preferably 110 MPa or more and more preferably 120 MPa or more. When the compression strength is less than 110 MPa, compared to the case in which the above range is satisfied, the binding property between the primary particles of the high Ni-containing lithium composite oxide is decreased, and the durability may be degraded in some cases. The compression strength can be measured, for example, using a micro compression testing machine MC T-211 manufactured by Shimadzu Corporation. In this measurement, after a powder of the positive electrode active material for nonaqueous electrolyte secondary batteries is placed in a sample stage, the center of one particle of the secondary particles is focused by a microscope, an indenter having a diameter of 20 μm was pressed thereto at a loading rate of 2.665 mN/sec, and a strength at which the breakage occurs is measured at N=10, so that the average value obtained therefrom can be regarded as the compression strength. In addition, although depending on the particle diameter of a high Ni-containing lithium composite oxide to be used and the like, the compression strength of the positive electrode active material for nonaqueous electrolyte secondary batteries is mainly influenced by the amount of the lithium carbonate on the surfaces of the primary particles inside the secondary particles of the high Ni-containing lithium composite oxide. Hence, by adjusting the content of the lithium carbonate, the compression strength of the positive electrode active material for nonaqueous electrolyte secondary batteries can be adjusted.

One example of a method for manufacturing a positive electrode active material for nonaqueous electrolyte secondary batteries according to this embodiment will be described.

The method for manufacturing a positive electrode active material for nonaqueous electrolyte secondary batteries according to this embodiment includes, for example, a step of forming a solid solution containing a high Ni-containing lithium composite oxide and lithium carbonate, and a step of attaching a rare earth compound and a tungsten compound to secondary particles of the high Ni-containing lithium composite oxide.

<Step of Forming Solid Solution>

For example, a lithium compound, such as lithium hydroxide or lithium carbonate, and a Ni-containing metal oxide are mixed together so that Ni is set to have a predetermined amount in terms of the molar ratio to Li atoms, and a mixture thus formed is fired at a predetermined temperature, so that a solid solution is obtained. If needed, the solid solution may be pulverized into particles having a predetermined particle diameter. The solid solution thus obtained contains secondary particles composed of aggregated primary particles of a high Ni-containing lithium composite oxide and lithium carbonate attached to the surfaces of the primary particles at the surfaces of the secondary particles and inside thereof. This lithium carbonate is, for example, lithium carbonate precipitated on the primary particles of the high Ni-containing lithium composite oxide when the lithium compound and the metal oxide containing N are fired, that is, an un-reacted lithium carbonate which is used as the raw material of the lithium compound.

A firing temperature at which the above solid solution is obtained is, for example, preferably 650° C. to 900° C. and particularly preferably 700° C. to 850° C. In addition, although the addition amounts of the lithium compound and the Ni-containing metal oxide, each of which is used as the raw material, are appropriately set to obtain a targeted high Ni-containing lithium composite oxide, for example, the lithium compound is preferably added so that the molar ratio of Li to the metals other than Li in the mixture containing the lithium compound and the N-containing metal oxide is 1.03 or more and is more preferably added so that the molar ratio of Li described above is 1.05 or more. When the molar ratio of Li in the mixture is less than 1.03, it is difficult that the content of the lithium carbonate in a finally obtained positive electrode active material for nonaqueous electrolyte secondary batteries is set to 0.3 percent by mass or more with respect to the total mass of the high Ni-containing lithium composite oxide.

In general, although a washing/filtration step is usually performed on an obtained solid solution, in this case, since the lithium carbonate attached to the surfaces of the primary particles at the surfaces of the secondary particles of the high Ni-containing lithium composite oxide and inside the secondary particles disappear, in this embodiment, the washing/filtration step is preferably not performed on the obtained solid solution.

<Attaching Step>

For example, after an aqueous solution containing a rare earth compound and an aqueous solution containing a tungsten compound are sprayed on the above solid solution on which no washing/filtration step is performed, heating/drying is performed, so that the rare earth compound and the tungsten compound are attached to the surfaces of the secondary particles of the high Ni-containing lithium composite oxide. As the aqueous solution containing a rare earth compound, for example, an acidic solution in which the rare earth compound is dissolved in a solvent, such as an acetic acid, a nitric acid, or a sulfuric acid, is used. Hence, the aqueous solution which contains a rare earth compound and which is sprayed on the solid solution mainly reacts with the lithium carbonate attached to the surfaces of the primary particles at the surfaces of the secondary particles of the high Ni-containing lithium composite oxide. Accordingly, the rare earth compound is mainly attached to the surfaces of the secondary particles of the high Ni-containing lithium composite oxide. In addition, most of the lithium carbonate attached to the surfaces of the secondary particles of the high Ni-containing lithium composite oxide disappears, and the lithium carbonate attached to the surfaces of the primary particles inside the secondary particles remains. In addition, as the aqueous solution containing a tungsten compound, for example, an alkali solution in which the tungsten oxide is dissolved in a lithium hydroxide aqueous solution is used. Hence, the aqueous solution containing a tungsten compound is not allowed to react with the lithium carbonate attached to the surfaces of the secondary particles of the high Ni-containing lithium composite oxide, so that the aqueous solution described above permeates into the secondary particles. Accordingly, by the heating/drying performed after the spray, the tungsten compound is likely to be attached not only to the surfaces of the secondary particles of the high Ni-containing lithium composite oxide but also to the surfaces of the primary particles inside the secondary particles.

As described above, a positive electrode active material for nonaqueous electrolyte secondary batteries can be obtained, the active material containing the secondary particles composed of aggregated primary particles of the high Ni-containing lithium composite oxide, the rare earth compound and the tungsten compound attached to the surfaces of the secondary particles, and the lithium carbonate attached to the surfaces of the primary particles inside the secondary particles, and the content of the lithium carbonate being 0.3 percent by mass or more with respect to the total mass of the high Ni-containing lithium composite oxide.

The positive electrode active material for nonaqueous electrolyte secondary batteries may also contain, for example, a lithium composite oxide other than the high Ni-containing lithium composite oxide. Although this lithium composite oxide is not particularly limited, for example, there may be mentioned a Li—Co composite oxide or a Li—Co-M composite oxide (M is at least one additive metal selected, for example, from Al, Mg, Ti, Cr, Cu, Ze, Sn, Zr, Nb, Mo, Ta, W, Na, K, Ba, Sr, Bi, Be, and B). Those composite oxides may be used alone, or at least two types thereof may be used in combination.

As an electrically conductive agent, for example, there may be mentioned a carbon powder, such as carbon black, acetylene black, Ketjen black, or graphite, and those materials may be used alone, or at least two types thereof may be used in combination.

As a binding agent, for example, there may be mentioned a fluorinated high molecular weight material, a rubber-based high molecular weight material, or the like. As the fluorinated high molecular weight material, for example, there may be mentioned a polytetrafluoroethylene (PTFE), a poly(vinylidene fluoride) (PVdF), a modified material thereof, or the like, and as the rubber-based high molecular weight material, for example, there may be mentioned an ethylene-propylene-isoprene copolymer, an ethylene-propylene-butadiene copolymer, or the like. Those materials may be used alone, or at least two types thereof may be used in combination.

<Negative Electrode>

The negative electrode includes, for example, a negative electrode collector, such as metal foil, and a negative electrode active material layer formed on the negative electrode collector. For the negative electrode collector, metal foil, such as copper, stable in a negative electrode potential range, a film on which the metal mentioned above is arranged as a surface layer, or the like may be used. The negative electrode active material layer includes, for example, a negative electrode active material, a binding material, a thickening agent, and the like.

The negative electrode can be obtained, for example, in such a way that after a negative electrode mixture slurry containing the negative electrode active material, the thickening agent, and a binding agent is applied to the negative electrode collector and then dried to form the negative electrode active material layer on the negative electrode collector, this negative electrode active material layer is then rolled.

The above negative electrode active material is not particularly limited as long as being capable of occluding and releasing lithium ions, and for example, there may be mentioned a carbon material, a metal capable of forming an alloy with lithium, an alloy compound containing the metal mentioned above, or the like. As the carbon material, graphite, such as natural graphite, non-graphitizable carbon, or artificial graphite, cokes, or the like may be used, and as the alloy compound, a compound containing at least one type of metal capable of forming an alloy with lithium may be mentioned. As an element capable of forming an alloy with lithium, silicon or tin is preferable, and silicon oxide, tin oxide, or the like, each of which is formed from the aforementioned element and oxygen bonded thereto, may also be used. In addition, a mixture formed by mixing the above carbon material with a compound of silicon or tin may also be used. Besides those compounds described above, there may also be used a compound, such as lithium titanate, having a higher charge/discharge potential relative to metal lithium than that of a carbon material or the like.

As the binding agent, for example, as is the case of the positive electrode, although a fluorinated high molecular weight material, a rubber-based high molecular weight material, or the like may be used, a styrene-butadiene copolymer (SBR), a modified compound thereof, or the like may also be used.

As the thickening agent, for example, a carboxymethyl cellulose (CMC), a poly(ethylene oxide) (PEO), or the like may be mentioned. Those compounds mentioned above may be used alone, or at least two types thereof may be used in combination.

<Nonaqueous Electrolyte>

The nonaqueous electrolyte contains a nonaqueous solvent and an electrolyte salt dissolved in the nonaqueous solvent. The nonaqueous electrolyte is not limited to a liquid electrolyte (nonaqueous electrolyte liquid) and may be a solid electrolyte using a gelled polymer or the like. As the nonaqueous solvent, for example, an ester, an ether, a nitrile, such as acetonitrile, an amide, such as dimethylformamide, and a mixed solvent containing at least two of those solvents mentioned above may be used. The nonaqueous solvent may also include a halogen substituent in which at least one hydrogen atom of one of the solvents mentioned above is substituted by a halogen atom, such as fluorine.

As an example of the ester described above, for example, there may be mentioned a cyclic carbonate ester, such as ethylene carbonate (EC), propylene carbonate (PC), or butylene carbonate; a chain carbonate ester, such as dimethyl carbonate (DMC), methyl ethyl carbonate (EMC), diethyl carbonate (DEC), methyl propyl carbonate, ethyl propyl carbonate, or methyl isopropyl carbonate; a cyclic carboxylic acid ester, such as γ-butyrolactone (GBL) or γ-valerolactone (GVL); or a chain carboxylic acid ester, such as methyl acetate, ethyl acetate, propyl acetate, methyl propionate (MP), ethyl propionate, or γ-butyrolactone.

As an example of the ether described above, for example, there may be mentioned a cyclic ether, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, or a crown ether; or a chain ether, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzen, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, or tetraethylene glycol dimethyl.

As the halogen substituent described above, for example, a fluorinated cyclic carbonate ester, such as fluoroethylene carbonate (FEC), a fluorinated chain carbonate ester, or a fluorinated chain carboxylic acid ester, such as methyl fluoropropionate (FMP), may be preferably used.

The electrolyte salt is preferably a lithium salt. As an example of the lithium salt, for example, there may be mentioned $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, and n indicates 1 or 2), $LiB_{10}Cl_{10}$, $LiCl$, $LiBr$, $LiI$, chloroborane lithium, a lower aliphatic lithium carbonate, a boric acid salt, such as $Li_2B_4O_7$ or $Li(B(C_2O_4)F_2)$, or an imide salt, such as $LiN(SO_2CF_3)_2$ or $LiN(C_lF_{2l+1}SO_2)(C_mF_{2m+1}SO_2)$ {l and m indicates an integer of 1 or more}. Those lithium salts may be used alone, or at least two types thereof may be used after mixing. Among those lithium salts, in view of the ion conductivity, the electrochemical stability, and the like, $LiPF_6$ is preferably used. The concentration of the lithium salt is preferably set to 0.8 to 1.8 mol per one liter of the nonaqueous solvent.

<Separator>

As the separator, a porous sheet having an ion permeability and insulating properties is used. As a particular example of the porous sheet, a fine porous thin film, a woven cloth, a non-woven cloth, or the like may be mentioned. As a material of the separator, for example, an olefin resin, such as a polyethylene or a polypropylene, or a cellulose is preferable. The separator may be a laminate including a cellulose fiber layer and a thermoplastic resin fiber layer, such as an olefin resin, and a separator having a surface to which an aramid resin or the like is applied may also be used. On at least one of the interfaces of the separator with the positive electrode and the negative electrode, a filler layer containing an inorganic filler may be formed. As the inorganic filler, for example, there may be mentioned an oxide containing at least one of titanium (Ti), aluminum (Al), silicon (Si), and magnesium (Mg), a phosphoric acid compound, or a phosphoric acid compound having a surface treated by a hydroxide or the like. The filler layer may be formed, for example, in such a way that a slurry containing the filler described above is applied to the surface of the positive electrode, the negative electrode, or the separator.

EXAMPLES

Hereinafter, although the present invention will be further described with reference to Examples, the present invention is not limited to the following Examples.

Example 1

[Formation of Positive Electrode Active Material]

$[Ni_{0.91}Co_{0.06}Al_{0.03}](OH)_2$ obtained by a co-precipitation method was roasted to obtain a transition metal oxide. This transition metal oxide and $Li_2CO_3$ were mixed with each other by an Ishikawa-type grinding mortar machine so that the molar ratio of Li to the total mass of Ni, Co, and Al was 1.06:1. Subsequently, this mixture was fired at 800° C. for 3 hours in an air atmosphere and then pulverized, so that a solid solution containing a high Ni-containing lithium composite oxide represented by $LiNi_{0.91}Co_{0.06}Al_{0.03}O_2$ and lithium carbonate attached to the surfaces of primary particles at the surfaces of secondary particles of the high Ni-containing lithium composite oxide and inside the secondary particles was obtained.

While 1,000 g of this solid solution was stirred, an erbium sulfate aqueous solution obtained by dissolving erbium oxide in a sulfuric acid and an aqueous solution obtained by dissolving tungsten oxide in a lithium hydroxide aqueous solution were sprayed. Next, a powder thus obtained was dried at 180° C. for 2 hours in a vacuum atmosphere. As described above, a positive electrode active material was obtained in which an erbium compound and a tungsten compound were attached to the surfaces of the secondary particles of the high Ni-containing lithium composite oxide, and lithium carbonate was attached to the surfaces of the primary particles inside the secondary particles. When the surface of the positive electrode active material thus obtained was observed by a SEM, and element mapping was performed by an EDS, it was confirmed that the erbium compound and the tungsten compound were attached to the surfaces of the secondary particles of the active material.

The material thus obtained was used as a positive electrode active material of Example 1. The BET specific surface area of the positive electrode active material thus obtained was 0.29 m$^2$/g, and the compression strength thereof was 158 MPa. The measurement methods were the same as those described above.

From the positive electrode active material thus obtained, the contents of the lithium carbonate, the erbium compound, and the tungsten compound were measured. The measurement methods were the same as those described above. As a result, the content of the lithium carbonate with respect to the total mass of the high Ni-containing lithium composite oxide was 0.62 percent by mass. In addition, the content of the erbium compound with respect to the total mass of the metal elements other than Li in the high Ni-containing lithium composite oxide was 0.11 percent by mass on an erbium element basis. In addition, the content of the tungsten compound with respect to the total mass of the metal elements other than Li in the high Ni-containing lithium composite oxide was 0.28 percent by mass on a tungsten element basis.

[Formation of Positive Electrode]

After the above positive electrode active material, carbon black functioning as an electrically conductive agent, a poly(vinylidene fluoride) functioning as a binding agent were mixed together to have a mass ratio of 95:2.5:2.5, N-methyl-2-pyrrolidone was added, so that a positive electrode mixture slurry was prepared. Next, after this positive electrode mixture slurry was applied to two surfaces of a positive electrode collector formed from aluminum foil and was then dried, rolling was performed by a rolling roller machine, so that a positive electrode in which a positive electrode active material layer was formed on each of the two surfaces of the positive electrode collector was formed.

[Formation of Negative Electrode]

Artificial graphite functioning as a negative electrode active material, a CMC (sodium carboxymethyl cellulose) functioning as a thickening agent, and a SBR (styrene-butadiene rubber) functioning as a binding agent were mixed together in an aqueous solution at a mass ratio of 98:1:1, so that a negative electrode mixture slurry was prepared. Subsequently, after this negative electrode mixture slurry was uniformly applied to two surfaces of a negative electrode collector formed from copper foil and was then dried, rolling was performed using a rolling roller machine, so that a negative electrode in which a negative electrode active material layer was formed on each of the two surfaces of the negative electrode collector was formed.

[Preparation of Nonaqueous Electrolyte Liquid]

After lithium hexafluorophosphate (LiPFE) was dissolved at a concentration of 1.3 mole/liter in a mixed solvent obtained by mixing ethylene carbonate (EC), methyl ethyl carbonate (MEC), and dimethyl carbonate (DMC) at a volume ratio of 2:2:6, vinylene carbonate (VC) was dissolved in the above mixed solvent at a concentration of 2.0 percent by mass, so that a nonaqueous electrolyte was prepared.

[Formation of Battery]

After a positive electrode collector tab was fitted to the positive electrode thus formed, a negative electrode collector tab was fitted to the negative electrode thus formed, and a separator was placed between the two electrodes, the positive electrode, the separator, and the negative electrode were wound to form a spiral shape, and a winding core was then pulled out, so that a spiral shape electrode body was formed. Next, this spiral shape electrode body was flattened by pressure, so that a flat electrode body was obtained. This flat electrode body and the above nonaqueous electrolyte liquid were placed in an aluminum-made exterior package, and peripheral portions of the aluminum-made exterior package were welded by heating, so that a nonaqueous electrolyte secondary battery was formed. A constant current charge was performed on the nonaqueous electrolyte secondary battery thus formed at 0.5 It (400 mA) until the voltage reached 4.2 V. Next, after a constant voltage charge was performed at a constant voltage of 4.2 V until the current reached 0.05 It (40 mA), the battery was left for 20 minutes. Subsequently, a constant current discharge was performed at 0.5 It (400 mA) until the voltage reached 2.5 V. The charge/discharge described above was performed as one cycle, so that the battery was stabilized. This nonaqueous electrolyte secondary battery was used as a battery of Example 1.

Comparative Example 1

After purified water was added to a solid solution obtained by a method similar to that of Example 1, and stirring and washing were then performed for 15 minutes, the lithium carbonate in the solid solution was removed by filtration. The solid solution after filtration was dried at 180° C. for 2 hours in a vacuum atmosphere. A material thus obtained was used as a positive electrode active material of Comparative Example 1. When the surface of the positive electrode active material thus obtained was observed by a SEM, and element mapping was performed by an EDS, an erbium compound and a tungsten compound were not attached to the surfaces of the secondary particles of the active material. The BET specific surface area of the positive electrode active material thus obtained was 0.95 m$^2$/g, and the compression strength thereof was 88 MPa.

From the positive electrode active material thus obtained, the content of the lithium carbonate was measured. As a result, the content of the lithium carbonate with respect to the total mass of the high Ni-containing lithium composite oxide was 0.12 percent by mass.

In Comparative Example 1, except for that the positive electrode active material formed in Comparative Example 1 was used, a battery was formed under conditions similar to those of Example 1.

Comparative Example 2

After purified water was added to a solid solution obtained by a method similar to that of Example 1, and stirring and washing were then performed for 15 minutes, the lithium carbonate in the solid solution was removed by filtration. While 1,000 g of the solid solution after filtration was stirred, an erbium sulfate aqueous solution in which erbium oxide was dissolved in a sulfuric acid was sprayed, and drying was then performed at 180° C. for 2 hours in a vacuum atmosphere. A material thus obtained was used as a positive electrode active material of Comparative Example 2. When the surface of the positive electrode active material thus obtained was observed by a SEM, and element mapping was performed by an EDS, it was confirmed that an erbium compound was attached to the surfaces of the secondary particles of the active material. The BET specific surface area of the positive electrode active material thus obtained was 0.97 m/g, and the compression strength thereof was 92 MPa.

From the positive electrode active material thus obtained, the contents of the lithium carbonate and the erbium compound were measured. As a result, the content of the lithium carbonate with respect to the total mass of the high Ni-containing lithium composite oxide was 0.12 percent by mass. In addition, the content of the erbium compound with respect to the total mass of the metal elements other than lithium in the high Ni-containing lithium composite oxide was 0.11 percent by mass on an erbium element basis.

In Comparative Example 2, except for that the positive electrode active material formed in Comparative Example 2 was used, a battery was formed under conditions similar to those of Example 1.

Comparative Example 3

After purified water was added to a solid solution obtained by a method similar to that of Example 1, and stirring and washing were then performed for 15 minutes, the lithium carbonate in the solid solution was removed by filtration. While 1,000 g of the solid solution after filtration was stirred, an aqueous solution in which tungsten oxide was dissolved in a lithium hydroxide aqueous solution was sprayed, and drying was then performed at 180° C. for 2 hours in a vacuum atmosphere. A material thus obtained was used as a positive electrode active material of Comparative Example 3. When the surface of the positive electrode active material thus obtained was observed by a SEM, and element mapping was performed by an EDS, it was confirmed that a tungsten compound was attached to the surfaces of the secondary particles of the active material. The BET specific surface area of the positive electrode active material thus obtained was 0.97 $m^2/g$, and the compression strength thereof was 86 MPa.

From the positive electrode active material thus obtained, the contents of the lithium carbonate and the tungsten compound were measured. As a result, the content of the lithium carbonate with respect to the total mass of the high Ni-containing lithium composite oxide was 0.12 percent by mass. In addition, the content of the tungsten compound with respect to the total mass of the metal elements other than lithium in the high Ni-containing lithium composite oxide was 0.28 percent by mass on a tungsten element basis.

In Comparative Example 3, except for that the positive electrode active material formed in Comparative Example 3 was used, a battery was formed under conditions similar to those of Example 1.

Comparative Example 4

After purified water was added to a solid solution obtained by a method similar to that of Example 1, and stirring and washing were then performed for 15 minutes, the lithium carbonate in the solid solution was removed by filtration. While 1,000 g of the solid solution after filtration was stirred, an erbium sulfate aqueous solution in which erbium oxide was dissolved in a sulfuric acid and an aqueous solution in which tungsten oxide was dissolved in a lithium hydroxide aqueous solution were sprayed, and drying was then performed at 180° C. for 2 hours in a vacuum atmosphere. A material thus obtained was used as a positive electrode active material of Comparative Example 4. When the surface of the positive electrode active material thus obtained was observed by a SEM, and element mapping was performed by an EDS, it was confirmed that an erbium compound and a tungsten compound were attached to the surfaces of the secondary particles of the active material. The BET specific surface area of the positive electrode active material thus obtained was 0.99 $m^2/g$, and the compression strength thereof was 90 MPa.

From the positive electrode active material thus obtained, the contents of the lithium carbonate, the erbium compound, and the tungsten compound were measured. As a result, the content of the lithium carbonate with respect to the total mass of the high Ni-containing lithium composite oxide was 0.12 percent by mass. In addition, the content of the erbium compound with respect to the total mass of the metal elements other than lithium in the high Ni-containing lithium composite oxide was 0.11 percent by mass on an erbium element basis. In addition, the content of the tungsten compound with respect to the total mass of the metal elements other than lithium in the high Ni-containing lithium composite oxide was 0.28 percent by mass on a tungsten element basis.

In Comparative Example 4, except for that the positive electrode active material formed in Comparative Example 3 was used, a battery was formed under conditions similar to those of Example 1.

Comparative Example 5

As is the case of Example 1, washing and filtration were not performed on a solid solution obtained by a method similar to that of Example 1. A material thus obtained was used as a positive electrode active material of Comparative Example 5. When the surface of the positive electrode active material thus obtained was observed by a SEM, and element mapping was performed by an EDS, an erbium compound and a tungsten compound were not attached to the surfaces of the secondary particles of the active material. The BET specific surface area of the positive electrode active material thus obtained was 0.26 $m^2/g$, and the compression strength thereof was 158 MPa.

From the positive electrode active material thus obtained, the content of the lithium carbonate was measured. As a result, the content of the lithium carbonate with respect to the total mass of the high Ni-containing lithium composite oxide was 0.58 percent by mass.

In Comparative Example 5, except for that the positive electrode active material formed in Comparative Example 5 was used, a battery was formed under conditions similar to those of Example 1.

Comparative Example 6

As is the case of Example 1, washing and filtration were not performed on a solid solution obtained by a method similar to that of Example 1. While 1,000 g of this solid solution was stirred, an erbium sulfate aqueous solution in which erbium oxide was dissolved in a sulfuric acid was sprayed. Subsequently, a powder thus obtained was dried at 180° C. for 2 hours in a vacuum atmosphere. A material thus obtained was used as a positive electrode active material of Comparative Example 6. When the surface of the positive electrode active material thus obtained was observed by a SEM, and element mapping was performed by an EDS, it was confirmed that an erbium compound was attached to the surfaces of the secondary particles of the active material. The BET specific surface area of the positive electrode active material thus obtained was 0.28 m²/g, and the compression strength thereof was 160 MPa.

From the positive electrode active material thus obtained, the contents of the lithium carbonate and the erbium compound were measured. As a result, the content of the lithium carbonate with respect to the total mass of the high Ni-containing lithium composite oxide was 0.61 percent by mass. In addition, the content of the erbium compound with respect to the total mass of the metal elements other than Li in the high Ni-containing lithium composite oxide was 0.11 percent by mass on an erbium element basis.

In Comparative Example 6, except for that the positive electrode active material formed in Comparative Example 6 was used, a battery was formed under conditions similar to those of Example 1.

Comparative Example 7

As is the case of Example 1, washing and filtration were not performed on a solid solution obtained by a method similar to that of Example 1. While 1,000 g of this solid solution was stirred, an aqueous solution in which tungsten oxide was dissolved in a lithium hydroxide solution was sprayed. Subsequently, a powder thus obtained was dried at 180° C. for 2 hours in a vacuum atmosphere. A material thus obtained was used as a positive electrode active material of Comparative Example 7. When the surface of the positive electrode active material thus obtained was observed by a SEM, and element mapping was performed by an EDS, it was confirmed that a tungsten compound was attached to the surfaces of the secondary particles of the active material. The BET specific surface area of the positive electrode active material thus obtained was 0.28 m²/g, and the compression strength thereof was 157 MPa.

From the positive electrode active material thus obtained, the contents of the lithium carbonate and the tungsten compound were measured. As a result, the content of the lithium carbonate with respect to the total mass of the high Ni-containing lithium composite oxide was 0.64 percent by mass. In addition, the content of the tungsten compound with respect to the total mass of the metal elements other than Li in the high Ni-containing lithium composite oxide was 0.28 percent by mass on a tungsten element basis.

<Measurement of Direct Current Resistance at Initial Charge/Discharge>

In a temperature environment at 25° C., the battery of each of Example 1 and Comparative Examples 1 to 7 was charged at a constant current of 0.5 It (400 mA) until the battery voltage reached 4.2 V and was then continuously charged at a constant voltage until the current reached 0.05 It (40 mA). An open voltage (OCV: open circuit voltage) at a point at which rest was taken for 120 minutes after the charge was finished was measured, and after discharge was performed for 10 seconds at a constant current of 0.5 It (400 mA), a voltage at a point at which the discharge was performed for 10 seconds was measured. In addition, the direct current resistance was measured by the following equation.

Direct current resistance (Ω)=(OCV (V) after rest for 120 minutes-voltage (V) after discharge for 10 seconds)/(current value(A))

In Table 1, the content of the erbium oxide, the content of the tungsten compound, and the content of the lithium carbonate in the positive electrode active material used in each of Example 1 and Comparative Examples 1 to 7, the BET specific surface area of the positive electrode active material used in each of Example 1 and Comparative Examples 1 to 7, and the direct current resistance at the initial charge/discharge of the battery of each of Example 1 and Comparative Examples 1 to 7 are shown.

TABLE 1

| | POSITIVE ELECTRODE ACTIVE MATERIAL | | | | |
|---|---|---|---|---|---|
| | CONTENT OF ERBIUM COMPOUND (PERCENT BY MASS) | CONTENT GF TUNGSTEN OXIDE (PERCENT BY MASS) | CONTENT OF LITHIUM CARBONATE (PERCENT BY MASS) | BET SPECIFIC SURFACE AREA (m²/g) | BATTERY DIRECT CURRENT RESISTANCE AT INITIAL CHARGE/ DISCHARGE (mΩ) |
| EXAMPLE | 0.11 | 0.28 | 0.62 | 0.29 | 133 |
| COMPARATIVE EXAMPLE 1 | — | — | 0.12 | 0.95 | 518 |
| COMPARATIVE EXAMPLE 2 | 0 11 | — | 0.12 | 0.97 | 534 |
| COMPARATIVE EXAMPLE 3 | — | 0.28 | 0.12 | 0.97 | 370 |
| COMPARATIVE EXAMPLE 4 | 0.11 | 0.28 | 0.12 | 0.99 | 370 |
| COMPARATIVE EXAMPLE 5 | — | — | 0.58 | 0.26 | 157 |
| COMPARATIVE EXAMPLE 6 | 0 11 | — | 0.61 | 0.28 | 166 |
| COMPARATIVE EXAMPLE 7 | — | 0.28 | 0.64 | 0.28 | 141 |

The BET specific surface area of the positive electrode active material used in the battery of each of Example 1 and Comparative Examples 5 to 7 showed a lower value than that of the BET specific surface area of the positive electrode active material used in the battery of each of Comparative Examples 1 to 4. The reason for this is inferred that since the content of the lithium carbonate attached to the surfaces of the primary particles inside the secondary particles of the high Ni-containing lithium composite oxide is large. In the cases of Example 1 and Comparative Examples 5 to 7, in order to increase the content of the lithium carbonate attached to the surfaces of the primary particles inside the secondary particles of the high Ni-containing lithium composite oxide, after the solid solution containing the high Ni-containing lithium composite oxide and the lithium carbonate was synthesized, washing and filtration were not performed on the above solid solution. As a result, the content of the lithium carbonate attached to the surfaces of the primary particles inside the secondary particles of the high Ni-containing lithium composite oxide was 0.3 percent by mass or more. The batteries of Example 1 and Comparative Examples 5 to 7, each of which used the positive electrode active material as described above, showed a low direct current resistance as compared to that of the battery of each of Comparative Examples 1 to 4, each of which did not satisfy the range described above. Furthermore, according to the positive electrode active material used in Example 1, the erbium compound and the tungsten compound were attached to the surfaces of the secondary particles of the high Ni-containing lithium composite oxide, and the battery of Example using the positive electrode active material as described above showed a further low direct current resistance as compared to that of the battery of each of Comparative Examples 5 to 7, each of which used the positive electrode active material not containing at least one of the erbium compound and the tungsten compound.

Examples 2 to 3

In Examples 2 to 3, the concentration of the erbium sulfate aqueous solution and the spray amount thereof were changed, and a positive electrode active material in which the content of erbium hydroxide on the surfaces of the secondary particles of the high Ni-containing lithium composite oxide was changed was formed.

When the surface of the positive electrode active material of Example 2 was observed by a SEM, and element mapping was performed by an EDS, it was confirmed that an erbium compound and a tungsten compound were attached to the surfaces of the secondary particles of the active material. The BET specific surface area of the positive electrode active material of Example 2 was 0.27 $m^2/g$, and the compression strength thereof was 160 MPa. The measurement methods were the same as those described above. From the positive electrode active material of Example 2, the contents of the lithium carbonate, the erbium compound, and the tungsten compound were measured. The measurement methods were the same as those described above. As a result, the content of the lithium carbonate with respect to the total mass of the high Ni-containing lithium composite oxide was 0.66 percent by mass. In addition, the content of the erbium compound with respect to the total mass of the metal elements other than Li in the high Ni-containing lithium composite oxide was 0.02 percent by mass on an erbium element basis. In addition, the content of the tungsten compound with respect to the total mass of the metal elements other than Li in the high Ni-containing lithium composite oxide was 0.28 percent by mass on a tungsten element basis.

When the surface of the positive electrode active material of Example 3 was observed by a SEM, and element mapping was performed by an EDS, it was confirmed that an erbium compound and a tungsten compound were attached to the surfaces of the secondary particles of the active material. The BET specific surface area of the positive electrode active material of Example 3 was 0.31 $m^2/g$, and the compression strength thereof was 154 MPa. The measurement methods were the same as those described above. From the positive electrode active material of Example 3, the contents of the lithium carbonate, the erbium compound, and the tungsten compound were measured. The measurement methods were the same as those described above. As a result, the content of the lithium carbonate with respect to the total mass of the high Ni-containing lithium composite oxide was 0.60 percent by mass. In addition, the content of the erbium compound with respect to the total mass of the metal elements other than Li in the high Ni-containing lithium composite oxide was 0.30 percent by mass on an erbium element basis. In addition, the content of the tungsten compound with respect to the total mass of the metal elements other than Li in the high Ni-containing lithium composite oxide was 0.28 percent by mass on a tungsten element basis.

Example 4

Except for that a neodymium sulfate aqueous solution was used instead of the erbium sulfate aqueous solution, and a neodymium compound was attached to the surfaces of the secondary particles of the high Ni-containing lithium composite oxide, a positive electrode active material of Example 4 was formed in a manner similar to that of Example 1. When the surface of the positive electrode active material thus obtained was observed by a SEM, and element mapping was performed by an EDS, it was confirmed that the neodymium compound and the tungsten compound were attached to the surfaces of the secondary particles of the active material. The BET specific surface area of the positive electrode active material of Example 4 was 0.28 $m^2/g$, and the compression strength thereof was 156 MPa. The measurement methods were the same as those described above.

From the positive electrode active material of Example 4, the contents of the lithium carbonate, the neodymium compound, and the tungsten compound were measured. The measurement methods were the same as those described above. As a result, the content of the lithium carbonate with respect to the total mass of the high Ni-containing lithium composite oxide was 0.63 percent by mass. In addition, the content of the neodymium compound with respect to the total mass of the metal elements other than Li in the high Ni-containing lithium composite oxide was 0.085 percent by mass on an erbium element basis. In addition, the content of the tungsten compound with respect to the total mass of the metal elements other than Li in the high Ni-containing lithium composite oxide was 0.28 percent by mass on a tungsten element basis.

Example 5

Except for that a samarium sulfate aqueous solution was used instead of the erbium sulfate aqueous solution, and a samarium compound was attached to the surfaces of the secondary particles of the high Ni-containing lithium composite oxide, a positive electrode active material of Example 5 was formed in a manner similar to that of Example 1. When the surface of the positive electrode active material thus obtained was observed by a SEM, and element mapping was performed by an EDS, it was confirmed that the samarium compound and the tungsten compound were attached to the surfaces of the secondary particles of the active material. The BET specific surface area of the positive electrode active material thus obtained was 0.29 m²/g, and the compression strength thereof was 158 MPa. The measurement methods were the same as those described above.

From the positive electrode active material of Example 5, the contents of the lithium carbonate, the samarium compound, and the tungsten compound were measured. The measurement methods were the same as those described above. As a result, the content of the lithium carbonate with respect to the total mass of the high Ni-containing lithium composite oxide was 0.61 percent by mass. In addition, the content of the samarium compound with respect to the total mass of the metal elements other than Li in the high Ni-containing lithium composite oxide was 0.09 percent by mass on an erbium element basis. In addition, the content of the tungsten compound with respect to the total mass of the metal elements other than Li in the high Ni-containing lithium composite oxide was 0.28 percent by mass on a tungsten element basis.

In each of Examples 2 to 5, a battery was formed in a manner similar to that of Example 1, and the direct current resistance at the initial charge/discharge was measured. In Table 2, the type of rare earth, the content of the rare earth compound, the content of the tungsten compound, and the content of the lithium carbonate in the positive electrode active material used in each of Examples 1 to 5, the BET specific surface area of the positive electrode active material used in each of Examples 1 to 5, and the direct current resistance at the initial charge/discharge of the battery of each of Examples 1 to 5 are shown.

TABLE 2

| | POSITIVE ELECTRODE ACTIVE MATERIAL | | | | |
|---|---|---|---|---|---|
| | TYPE OF RARE EARTH | CONTENT OF RARE EARTH COMPOUND (PERCENT BY MASS) | CONTENT OF TUNGSTEN OXIDE (PERCENT BY MASS) | CONTENT OF LITHIUM CARBONATE (PERCENT BY MASS) | BET SPECIFIC SURFACE AREA (m²/g) | BATTERY DIRECT CURRENT RESISTANCE AT INITIAL CHARGE/ DISCHARGE (mΩ) |
| EXAMPLE 1 | Er | 0.11 | 0.28 | 0.62 | 0.29 | 133 |
| EXAMPLE 2 | Er | 0.02 | 0.28 | 0.66 | 0.27 | 135 |
| EXAMPLE 3 | Er | 0.30 | 0.28 | 0.60 | 0.31 | 136 |
| EXAMPLE 4 | Nd | 0.085 | 0.28 | 0.63 | 0.28 | 136 |
| EXAMPLE 5 | Sm | 0.09 | 0.28 | 0.61 | 0.29 | 135 |

The batteries of Examples 1 to 5 showed equivalent performances in terms of the direct current resistance at the initial charge/discharge. That is, the rare earth element forming the rare earth compound attached to the secondary particles of the positive electrode active material is preferably at least one selected from Nd, Sm, and Er.

REFERENCE SIGNS LIST

10 positive electrode active material
20 primary particle
21 secondary particle
22 rare earth compound
23 tungsten compound
24 lithium carbonate

The invention claimed is:

1. A positive electrode active material for nonaqueous electrolyte secondary batteries, comprising:
   secondary particles composed of aggregated primary particles of a lithium composite oxide containing Ni;
   a rare earth compound attached to the surfaces of the secondary particles;
   a tungsten compound attached to the surfaces of the secondary particles, and
   lithium carbonate attached to the surfaces of the primary particles inside the secondary particles,
   wherein the rate of Ni in the lithium composite oxide containing Ni with respect to the total number of moles of metal elements other than lithium in the lithium composite oxide containing Ni is 80 percent by mole or more, and
   the content of the lithium carbonate with respect to the total mass of the lithium composite oxide containing Ni is 0.3 percent by mass or more,
   wherein the content of the rare earth compound with respect to the total mass of the metal elements other than lithium in the lithium composite oxide containing Ni is 0.02 to 0.5 percent by mass on a rare earth element basis.

2. The positive electrode active material for nonaqueous electrolyte secondary batteries according to claim 1,
   wherein the compression strength of the positive electrode active material for nonaqueous electrolyte secondary batteries is 110 MPa or more.

3. The positive electrode active material for nonaqueous electrolyte secondary batteries according to claim 1,
   wherein the BET specific surface area of the positive electrode active material for nonaqueous electrolyte secondary batteries is 0.05 to 0.8 m²/g.

4. The positive electrode active material for nonaqueous electrolyte secondary batteries according to claim 1,
   wherein the rare earth element forming the rare earth compound is at least one element selected from Nd, Sm, and Er.

5. A nonaqueous electrolyte secondary battery comprising:
   a positive electrode which includes the positive electrode active material for nonaqueous electrolyte secondary batteries according to claim 1.

6. The positive electrode active material for nonaqueous electrolyte secondary batteries according to claim 1,
   wherein the rare earth compound comprises at least one compound selected from a hydroxide, an oxyhydroxide, an oxide, a carbonate compound, a phosphate compound, and a fluorine compound.

7. The positive electrode active material for nonaqueous electrolyte secondary batteries according to claim 1,
   wherein the content of the tungsten compound with respect to the total mass of the metal elements other than lithium in the lithium composite oxide containing Ni is 0.1 to 5.0 percent by mass on a tungsten element basis.

* * * * *